United States Patent
Gernandt

(10) Patent No.: US 10,607,287 B2
(45) Date of Patent: Mar. 31, 2020

(54) REAL-TIME INDICATOR OF GLOBAL TRADE

(71) Applicant: Kuehne + Nagel International AG, Schindellegi (CH)

(72) Inventor: Karl Gernandt, Schindellegi (CH)

(73) Assignee: Kuehne + Nagel International AG, Schindellegi (CH)

( * ) Notice: Subject to any disclaimer, the term of this patent is extended or adjusted under 35 U.S.C. 154(b) by 1296 days.

(21) Appl. No.: 14/273,841

(22) Filed: May 9, 2014

(65) Prior Publication Data

US 2015/0324913 A1  Nov. 12, 2015

(51) Int. Cl.
*G06Q 40/04* (2012.01)
*G06Q 10/08* (2012.01)

(52) U.S. Cl.
CPC ......... *G06Q 40/04* (2013.01); *G06Q 10/0831* (2013.01)

(58) Field of Classification Search
CPC ............................ G06Q 40/04; G06Q 10/0831
See application file for complete search history.

(56) References Cited

U.S. PATENT DOCUMENTS

| 7,328,804 | B2* | 2/2008 | Andre | B65D 19/12 206/386 |
| 7,395,237 | B1* | 7/2008 | Hall | G06Q 10/08 705/26.44 |
| 8,078,485 | B1* | 12/2011 | Kraehmueller | G06Q 10/063 705/7.11 |
| 2006/0026114 | A1* | 2/2006 | Gregoire | G06F 16/9535 |
| 2009/0322510 | A1* | 12/2009 | Berger | G06Q 10/08 340/539.1 |
| 2013/0104035 | A1* | 4/2013 | Wagner | H04W 4/029 715/240 |
| 2015/0048941 | A1* | 2/2015 | Wagner | G06Q 10/06 340/539.13 |

OTHER PUBLICATIONS

Bank, W. (2010). World development indicators 2010. Herndon: World Bank Publications. Retrieved from https://search.proquest.com/docview/2130927055?accountid=14753.*
Fabozzi, F. J., Fuss, R., Kaiser, D. G., & Fabozzi, J. F. (2008). The handbook of commodity investing (1st ed.). New York: John Wiley & Sons, Incorporated. Retrieved from https://search.proquest.com/docview/2130876076?accountid=14753.*

* cited by examiner

*Primary Examiner* — Muriel S Tinkler
(74) *Attorney, Agent, or Firm* — Kirton McConkie; Brian Tucker

(57) ABSTRACT

A real-time indicator of global trade can be generated. The real-time indicator provides a comprehensive indicator of the current global economic state by tracking current values for the available capacity for freight shipments as well as the volume of actual shipments. The capacity and volume can be tracked over multiple different transportation modes including sea, air, and rail. The real-time indicator is generated in real-time based on these current values. The real-time indicator can therefore provide investors, analysts, researchers, bankers, and the like with a reliable indicator of the current global economic state that is not heavily influenced by the biasing sentiments of individuals.

17 Claims, 2 Drawing Sheets

REAL-TIME INDICATOR OF GLOBAL TRADE

CROSS-REFERENCE TO RELATED APPLICATIONS

Not Applicable.

BACKGROUND

Macroeconomic data such as trade balances and worldwide exports are based on past data and are published with a considerable time lag. Many types of macroeconomic data are generated using a trend following system that tracks trends in historical data. Therefore, current macroeconomic data only represents a previous economic state.

Additionally, many indicators of economic state are only relevant to a particular zone or country while others are only relevant to a particular industry or trade. Other indicators are based heavily on the sentiment of individuals (e.g. stock market indices, sentiment indices, diffusion indices, etc.), but are not directly tied to the global economic state. Current macroeconomic data and indicators therefore fail to provide reliable information regarding the global economic state.

BRIEF SUMMARY

The present invention extends to methods, systems, and computer program products for generating a real-time indicator of global trade. The real-time indicator provides a comprehensive indicator of the current global economic state by tracking current values for the available capacity for freight shipments as well as the volume of actual shipments. The capacity and volume can be tracked over multiple different transportation modes including sea, air, and rail. The real-time indicator is generated in real-time based on these current values. The real-time indicator can therefore provide investors, analysts, researchers, bankers, and the like with a reliable indicator of the current global economic state that is not heavily influenced by the biasing sentiments of individuals.

In one embodiment, the present invention is implemented as a method for generating a real-time indicator of global trade. One or more capacity metrics are received. The one or more capacity metrics represent freight capacity for a first type of freight during a first time period. One or more volume metrics are also received. The one or more volume metrics represent freight volume for the first type of freight during the first time period. A first capacity component is generated based on the one or more capacity metrics. A first volume component is also generated based on the one or more volume metrics. The first capacity component and the first volume component are combined to generate the real-time indicator of global trade. Then, the real-time indicator of global trade is transmitted to another computing system.

In some embodiments, the one or more capacity metrics and the one or more volume metrics can represent the capacity and volume of sea freight, air freight, or rail freight during the first time period.

In embodiments where the first type of freight comprises sea freight, the one or more capacity metrics may comprise one or more of gross tonnage, gross tonnage kilometers, number of departures, or speed, and the one or more volume metrics may comprise one or more of twenty-foot units, number of shipments, shipment kilometers, or draft.

In embodiments were the first type of freight comprises air freight, the one or more capacity metrics may comprise one or more of available freight tonnage, available freight tonnage kilometers, and a number of departures, and the one or more volume metrics comprise one or more of a number of shipments, chargeable weight, and chargeable weight kilometers.

In some embodiments, the real-time indicator of global trade may be generated by combining capacity and volume components for two or more of sea freight, air freight, and rail freight. In some embodiments, an economic sentiment component may also be combined to generate the real-time indicator.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
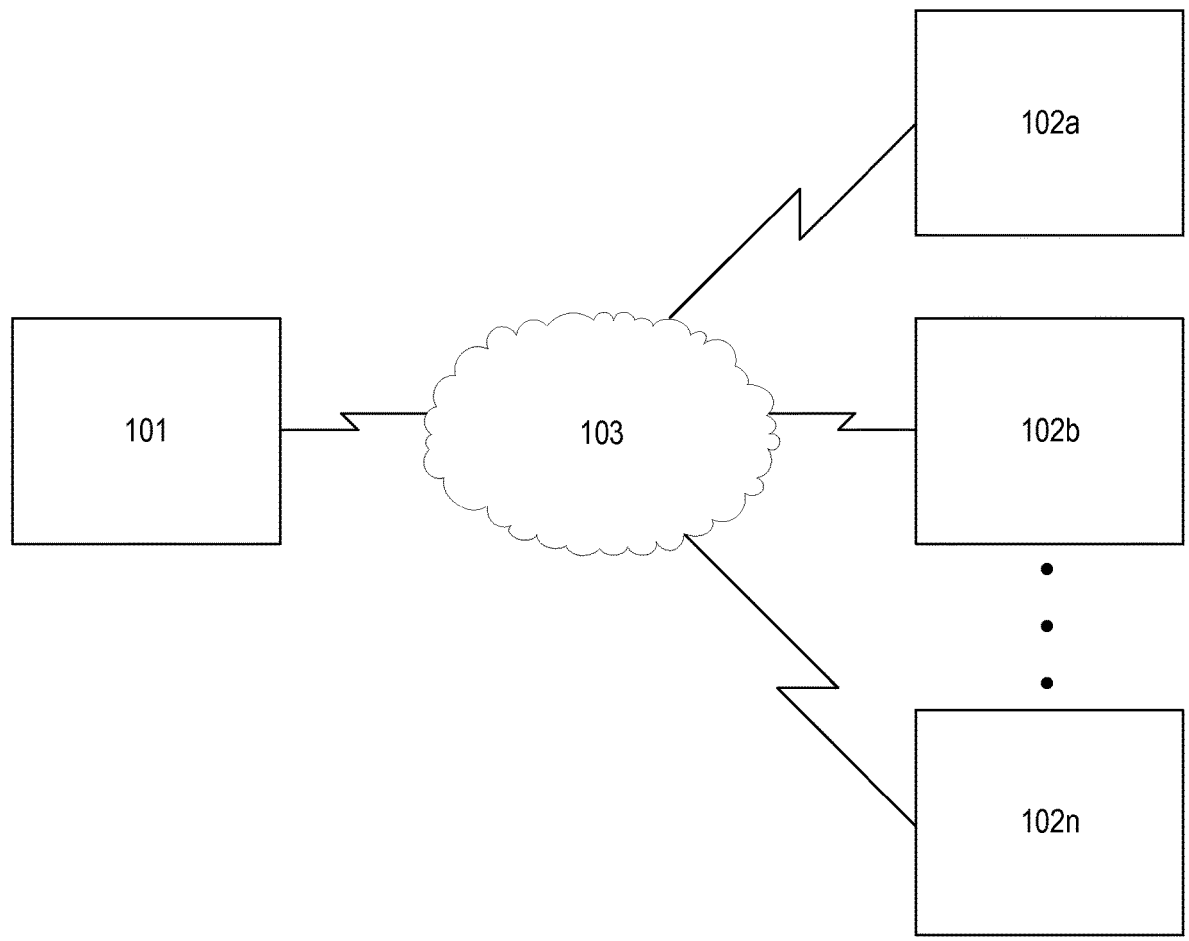
FIG. 1 illustrates an example computing environment in which the present invention can be implemented.

The present invention extends to methods, systems, and computer program products for generating a real-time indicator of global trade. The real-time indicator provides a comprehensive indicator of the current global economic state by tracking current values for the available capacity for freight shipments as well as the volume of actual shipments. The capacity and volume can be tracked over multiple different transportation modes including sea, air, and rail. The real-time indicator is generated in real-time based on these current values. The real-time indicator can therefore provide investors, analysts, researchers, bankers, and the like with a reliable indicator of the current global economic state that is not heavily influenced by the biasing sentiments of individuals.

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

FIG. 1 illustrates an example computer environment 100 in which the present invention can be implemented. Computer environment 100 includes a server system 101, a plurality of source systems 102a-102n, and one or more networks 103. Network 103, in a typical implementation, can represent the internet over which server system 101 receives information from source systems 102a-102n. However, network 103 can also encompass one or more local networks such as when server system 101 has a local connection to one or more source systems 102a-102n. In short, server system 101 can be connected to and receive information from source systems 102a-102n using any type of network connection.

Server system 101 represents the computing components and architecture employed to obtain information from source systems 102a-102n and to generate a real-time indicator from such information. Server system 101 can therefore represent a single computing device, multiple interoperating computing devices, or a cloud-based system. Although not depicted, server system 101 can be connected to one or more client computing systems (e.g. via the internet) to enable server system 101 to provide the real-time indicator to the client computing systems. Server system 101 can provide access to the real-time indicator in any suitable way as is known in the art.

Source systems 102a-102n can represent any computing device or system with which server system 101 can communicate to receive information that can be used to generate the real-time indicator. As will be further described below, source systems 102a-102n can include systems that provide information regarding the capacity and volume of a transportation means such as the capacity and volume of sea vessels, aircraft, trains, etc. In some embodiments, source systems 102a-102n can also include one or more servers that provide information regarding the growth of businesses including job offers made by businesses.

Server system 101 can be configured to obtain information from source systems 102a-102n on a continual basis. For example, server system 101 can query one or more of source systems 102a-102n on a continual basis such as every minute, every hour, every day, etc. Server system 101 can store the information obtained from source systems 102a-102n so that information obtained over a duration of time can be aggregated to generate the real-time indicator (e.g., as a moving average). In this specification, a seven day (168 hours or 10,080 minutes) moving average will generally be used as an example for generating the real-time indicator; however, other durations could equally be used.

Server system 101 can generate a real-time indicator from a plurality of components. The components used to generate a particular instance of a real-time indicator can be selected from the following: a sea freight capacity component; a sea freight volume component; an air freight capacity component, an air freight volume component; a rail freight capacity component; a rail freight volume component; and an economic sentiment component. In some embodiments, server system 101 may generate a real-time indicator based on only two of these components. In other embodiments, server system 101 may generate a real-time indicator based on more than two components including all of the components.

Each component can be generated based on information obtained from source systems 102a-102n. This information may be obtained (or updated) at the same frequency or at different frequencies, and therefore, each component may be updated at the same frequency or at a different frequency. Regardless of the frequency at which each individual component is updated, the real-time indicator generated from two or more of the components can be updated on a rolling basis as described above such as by using a moving average of the components. In some embodiments, the average may be a weighted average.

In some embodiments, one or more of source systems 102a-102n from which sea freight information is obtained can be an Automatic Identification System (AIS). The AIS is a tracking system that most sea vessels are required to employ for reporting various types of information about the vessel. This information includes an identifier and type of the vessel, its position, course, speed, and destination, its estimated time of arrival, its draft (or draught)—a measure of the vertical distance between the waterline and the bottom of the hull, and its gross tonnage—a measure of the vessel's overall internal volume. This information is reported by the vessels on a periodic basis both when in transit and while at port.

In some embodiments, one or more of source systems 102a-102n from which air freight information is obtained can be an Instrument Flight Rules (IFR) system, a Visual Flight Rules (VFR) system, an Automatic Dependent Surveillance-Broadcast (ADS-B) system, an Air Data Link system, a system providing information or characteristics (e.g. capacity) of an aircraft, or a system providing scheduling information for flights. Such systems require an aircraft to report various types of information including its identification, position, speed, direction, destination, etc.

In some embodiments, one or more of source systems 102a-102n can provide rail freight information. This information can include a number of cars of a train, a number of carloads, a number of intermodal units, and the number of train departures. In some embodiments, one or more of source systems 102a-102n can provide information regarding business's intention to grow such as information describing job offers made by the business.

Sea Freight Capacity Component

The sea freight capacity component can represent the capacity of various types of vessels that are employed for transporting sea freight. The sea freight capacity component therefore provides an indication of the amount of freight that could be transported by sea at a given time. This is in contrast to the sea freight volume component that represents the actual quantity of freight that is transported.

The sea freight capacity component can be based on one or more metrics including gross tonnage, gross tonnage kilometers, number of departures, and speed. The gross tonnage of a vessel is generally defined as the internal volume of the vessel. Gross tonnage kilometers is generally defined as the gross tonnage of a vessel multiplied by the distance (in kilometers) traveled by the vessel. Number of departures generally refers to the number of vessels that are/were scheduled to depart within a specified time period (e.g. seven days).

In some embodiments, server system 101 can obtain one or more of these metrics via the AIS. For example, server system 101 can query one or more of source systems 102a-102n to obtain one or more of the gross tonnage, gross tonnage kilometers, and speed of various vessels. Server system 101 may also obtain the number of departures from such source systems, or may independently calculate the number of departures from the information obtained from the source systems (e.g. by determining how many vessels were at port but are now at sea).

In some embodiments, a specified type or number of vessels can be monitored and used in the generation of the sea freight capacity component. For example, server system 101 can monitor the above factors for vessels that have greater than or equal to 2,000 gross tonnage. Based on this criteria and at the present time, server system may monitor approximately 20,000 container and cargo vessels, 17,000 tankers, and 12,000 bulk carriers on a daily basis.

A number of departures (NOD) factor can be generated by summing the number of vessels that have departed over a particular time period. As stated above, an example rolling time period of seven days (168 hours or 10,080 minutes) will be used in this specification. Therefore, the NOD factor at a particular time can define a number of vessels (e.g., the number of the approximately 49,000 monitored vessels) that have departed over the seven day period prior to the particular time. In some embodiments, sub-NOD factors can be generated for each type of vessel. For example, a container/cargo vessel NOD factor, a tanker NOD factor, and a bulk carrier NOD factor can be individually generated and then summed to generate the NOD factor.

A gross tonnage (GT) factor can be generated by summing the gross tonnage of each vessel that has departed over the particular time period. The GT factor therefore represents the sum of the internal volumes of all monitored vessels that departed during the particular time period. In some embodiments, sub-GT factors can be generated for each type of vessel, and then these sub-GT factors can be summed to yield the GT factor.

A gross tonnage kilometers (GTK) factor can be generated by summing the gross tonnage kilometers of each monitored vessel that has departed over the particular time period. Each vessel's gross tonnage kilometers can be determined by multiplying the vessel's gross tonnage by the planned distance to travel (i.e., the distance between its departure location and its intended destination). As with the other factors, in some embodiments, sub-GTK factors can first be generated for each type of ship and then summed to yield the GTK factor.

A GO/STOP factor can be generated as the ratio of vessels in transit versus the number of vessels in port (or reporting 0 knots). As with the other factors, in some embodiments, sub-GO/STOP factors can first be generated for each type of ship and then summed to yield the GO/STOP factor.

A knots (KTS) factor can be generated by averaging the speed of all monitored vessels that are in transit at a particular time. For example, for a real-time indicator generated for a particular time, the speed of all monitored vessels that are in transit at that particular time can be averaged. As with the other factors, in some embodiments, sub-KTS factors can first be generated for each type of ship and then summed to yield the KTS factor.

The sea freight capacity component can be generated by combining some or all of the NOD factor, the GT factor, the GTK factor, the GO/STOP factor, and the KTS factor. For example, the sea freight capacity component can be generated by performing an average (including a weighted average) of two or more of the factors or by summing two or more of the factors.

Sea Freight Volume Component

The sea freight volume component can represent the quantity of freight that is transported by sea during a particular time period. The sea freight volume component can be derived from information received about container vessels. Container vessels transport containers having standardized dimensions. A twenty-foot equivalent unit (TEU) is a standard unit of cargo capacity and volume. The TEU is based on the volume of a twenty-foot-long container that is easily transferred between different modes of transportation including vessels, trains, and trucks. There are containers of different sizes and configurations (e.g., a forty-foot-long container), but the volume of each container can be represented using the TEU.

The sea freight volume component can be based on one or more metrics including the TEU, a number of shipments, shipment kilometers, and draft. Number of shipments generally refers to the number of orders for shipment with each order encompassing one or multiple TEUs. Shipment kilometers generally refers to the distance that a shipment will be transported. Draft (or draught) is generally defined as the vertical distance between the waterline and the bottom of the vessel's hull. Draft can be used as a measurement of the weight of cargo on a vessel (e.g., by comparing a vessel's draft when unloaded to its draft when loaded).

As stated above, these metrics can be obtained regarding a number of container vessels. Server system 101 can query one or more of source systems 102a-102n (e.g. systems of sea freight shipment companies) to identify the number of shipments over a particular duration of time, the distance of the shipments, and the number of TEUs in each shipment. In some embodiments, the draft of the vessels carrying the shipments can be obtained from an AIS system.

A TEU factor can be generated by summing the TEUs transported over a particular duration of time. For example, a total number of TEUs shipped by a number of sea freight shipping companies over a seven day period could be summed to generate the TEU factor.

A number of shipments (NOS) factor can be generated by summing the number of shipments (or orders) made over a particular duration of time. The NOS factor differs from the TEU factor in that a shipment may include multiple TEUs.

The NOS factor when compared to the TEU factor can therefore provide an indication of the average number of TEUs per shipment.

A shipment kilometers (SHK) factor can be generated by summing the distance of each shipment. For example, if a shipment of 50 TEUs is being or was shipped 5000 kilometers, the shipment kilometers for the shipment would be 5000. The SHK factor can comprise the sum of the shipment kilometers for each shipment.

An EXPORT/IMPORT factor can be generated by calculating the ratio of exports to imports. The number of exports can be determined based on a number of departures whereas the number of imports can be determined based on a number of arrivals. Because of the substantial time lag between the port of loading (export) and the port of discharge (import), the numbers of exports vs. imports can vary drastically for a given time period. The EXPORT/IMPORT factor can therefore represent the momentum of exports vs. imports within a particular time period. In some embodiments, the time period used for generating the EXPORT/IMPORT factor may be larger than the time period used for other factors. For example, a 28 day time period may be used for the EXPORT/IMPORT factor while a 7 day time period may be used for other factors.

A NOS COUNTRIES factor may be generated based on the number of shipments that are exported from and imported to each of a number of countries. For example, a value can be generated for each of 189 countries where the value defines the number of imports to the country added to the number of exports from the country over a particular time period. In some embodiments, the value for a particular country may be weighted using a factor representing the countries share of world gross domestic product.

A draft (DR) factor can be generated based on the draft of each monitored vessel during a particular period of time. The DR factor provides a rough estimate of the capacity utilization of all monitored vessels (i.e. by representing the weight of the vessel's freight). In some embodiments, the DR factor can be generated by averaging the draft of each vessel.

The sea freight volume component can be generated by combining some or all of the TEU factor, the NOS factor, the SHK factor, the EXPORT/IMPORT factor, the NOS COUNTRIES factor, and the DR factor. For example, the sea freight volume component can be generated by performing an average (including a weighted average) of two or more of the factors or by summing two or more of the factors.

Air Freight Capacity Component

The air freight capacity component can represent the movement of cargo and commercial aircraft. The air freight capacity component can be based on one or more metrics including available freight tonnage, available freight tonnage kilometers, and number of departures. Available freight tonnage generally refers to the available capacity of a cargo aircraft. Available freight tonnage kilometers generally refers to the available freight tonnage of a cargo aircraft multiplied by the kilometers traveled (or to be traveled). The metrics used to generate the air freight capacity component can be obtained from various sources including an IFR system, a VFR system, an ADS-B system, an Air Data link system, various airline systems, etc.

A number of cargo departures ($NOD_{cargo}$) factor and a number of commercial departures ($NOD_{commercial}$) factor can be generated by determining the number of cargo and commercial aircraft respectively that departed during a particular time period (e.g., 7 days). Commercial departures encompass departures of both cargo aircraft and passenger aircraft, and therefore, the number of cargo departures is a subset of the number of commercial departures.

An available freight tonnage (AFT) factor can be generated by summing the available capacity of all monitored cargo aircraft that departed during the particular time period. Similarly, an available freight tonnage kilometers (AFTK) factor can be generated by summing the available freight tonnage kilometers of all monitored cargo aircraft that departed during the particular time period.

A number of scheduled commercial departures ($NOD\ SCHEDULED_{commercial}$) factor and a number of scheduled cargo departures ($NOD\ SCHEDULED_{cargo}$) factor can be generated by determining the number of commercial and cargo departures respectively that are scheduled over an upcoming period of time (e.g., the next seven days).

An aircraft very short term plan ($VSTP_{aircraft}$) factor can be generated as the ratio of the number of cargo departures that actually occurred during a particular time period (e.g. the past 7 days) to the number of cargo departures that were scheduled during the same time period.

The air freight capacity component can be generated by combining some or all of the $NOD_{cargo}$, $NOD_{commercial}$, AFT, AFTK, $NOD\ SCHEDULED_{commercial}$, $NOD\ SCHEDULED_{cargo}$, and $VSTP_{aircraft}$ factors. For example, the air freight capacity component can be generated by performing an average (including a weighted average) of two or more of the factors or by summing two or more of the factors.

Air Freight Volume Component

The air freight volume component can represent the quantity of freight that is transported by air during a particular time period. The air freight volume component can be generated based on one or more metrics including a number of shipments, chargeable weight, and chargeable weight kilometers. Number of shipments, as with sea freight, refers to the number of orders for shipment. Chargeable weight is a unit of measurement that defines how much will be charged to ship freight. The chargeable weight is typically determined based on the greater of the dimensional and actual weight of the freight. Chargeable weight kilometers generally refers to the chargeable weight of freight multiplied by the distance the freight is or will be shipped.

A chargeable weight (CW) factor can be generated by summing the chargeable weight of the freight on all monitored cargo aircraft over a particular time period. A chargeable weight kilometers (CWK) factor can be generated by summing the chargeable weight kilometers of each monitored cargo aircraft over the particular time period.

A number of shipments ($NOS_{cargo}$) factor can be generated by summing the number of shipments by all monitored cargo aircraft over the particular time period. A $NOS_{cargo}$ COUNTRIES factor can be generated based on the number of shipments that are exported from and imported to each of a number of countries. For example, a value can be generated for each of 189 countries where the value defines the number of imports to the country added to the number of exports from the country over a particular time period. In some embodiments, the value for a particular country may be weighted using a factor representing the countries share of world gross domestic product.

The air freight volume component can be generated by combining some or all of the CW factor, the CWK factor, the $NOS_{cargo}$ factor, and the $NOS_{cargo}$ COUNTRIES factor. For example, the air freight volume component can be generated by performing an average (including a weighted average) of two or more of the factors or by summing two or more of the factors.

Rail Freight Capacity Component

The rail freight capacity component can represent the movement of trains including the number of cars in the trains. The rail freight capacity component can be generated based on one or more metrics including the number of cars and the number of departures.

A CARS factor can be generated by summing the number of cars in each monitored train over a particular time period. A number of departures ($NOD_{trains}$) component can be generated by determining a number of trains that departed during the particular time period.

A $VSTP_{trains}$ factor can be generated as the ratio of the number of train departures that actually occurred during a particular time period (e.g. the past 7 days) to the number of train departures that were scheduled during the same time period.

The rail freight capacity component can be generated by combining some or all of the CARS, $NOD_{train}$, and $VSTP_{trains}$ factors. For example, the rail freight capacity component can be generated by performing an average (including a weighted average) of two or more of the factors or by summing two or more of the factors.

Rail Freight Volume Component

The rail freight volume component represents the quantity of freight that is transported via rail during a particular time period. The rail freight volume component can be based on one or more metrics including a number of carloads and intermodal units.

A CARLOADS factor can be generated by summing the number of carloads transported by monitored trains during a particular time period. An INTERMODAL UNITS factor can be generated by summing the number of intermodal units transported by monitored trains during the particular time period.

The rail freight volume component can be generated by combining one or both of the CARLOADS and INTERMODAL UNITS. For example, the rail freight volume component can be generated by performing an average (including a weighted average) of the factors or by summing the factors.

Economic Sentiment Component

The economic sentiment component represents whether companies intend to expand, stabilize or contract business. The economic sentiment component can be generated by monitoring selected websites to identify indications of a company's intentions. For example, a company may publish a number of job offers or another indication of a desire to grow. The economic sentiment component can therefore comprise a value that represents the number of companies that have indicated an intention to grow.

In some embodiments, the economic sentiment can be based on an average of the number of job offers over a period of time. For example, after an average number of job offers has been determined, a current number of job offers can be determined and compared to the average. The economic sentiment component can be based on the variance of the current number of job offers to the average.

In some embodiments, the economic sentiment component can be based on sub-components for each monitored country. In such cases, each sub-component can be weighted based on the corresponding country's share of the world GDP and then summed.

Real-Time Indicator

Server system 101 can generate a real-time indicator based on a combination of one or more of the above components. In some embodiments, a real-time indicator can be generated as the average of each of the above components. In some embodiments, each component may be weighted. For example, the sea freight capacity and volume components may be weighted more heavily than the other components since sea freight comprises a larger percentage of global freight transportation.

In some embodiments, a real-time indicator for each of a plurality of countries may be generated. Because the capacity components are not attributable to a single country, only the volume components and the economic sentiment component may be used to generate a country specific real-time indicator. For example, a real-time indicator for the United States may comprise the average of the sea, air, and rail freight volume components corresponding to the United States and an economic sentiment component representing job offers in the United States.

In some embodiments, to provide a better representation of the current economic status, the components used to generate the real-time indicator as well as the real-time indicator itself can be compared to a long-term trend. For example, long-term trend values can be established for each component and for the real-time indicator. Then, when new values are generated for the components and real-time indicator, these new values can be compared to the long-term trend. The components and real-time indicator can then be represented as deviations from the long-term trend. Using this approach, a positive value of a component or of the real-time indicator can represent positive growth above the long-term trend. In contrast, a zero or negative value can represent no growth or growth below the long-term trend respectively.

Figure 2:
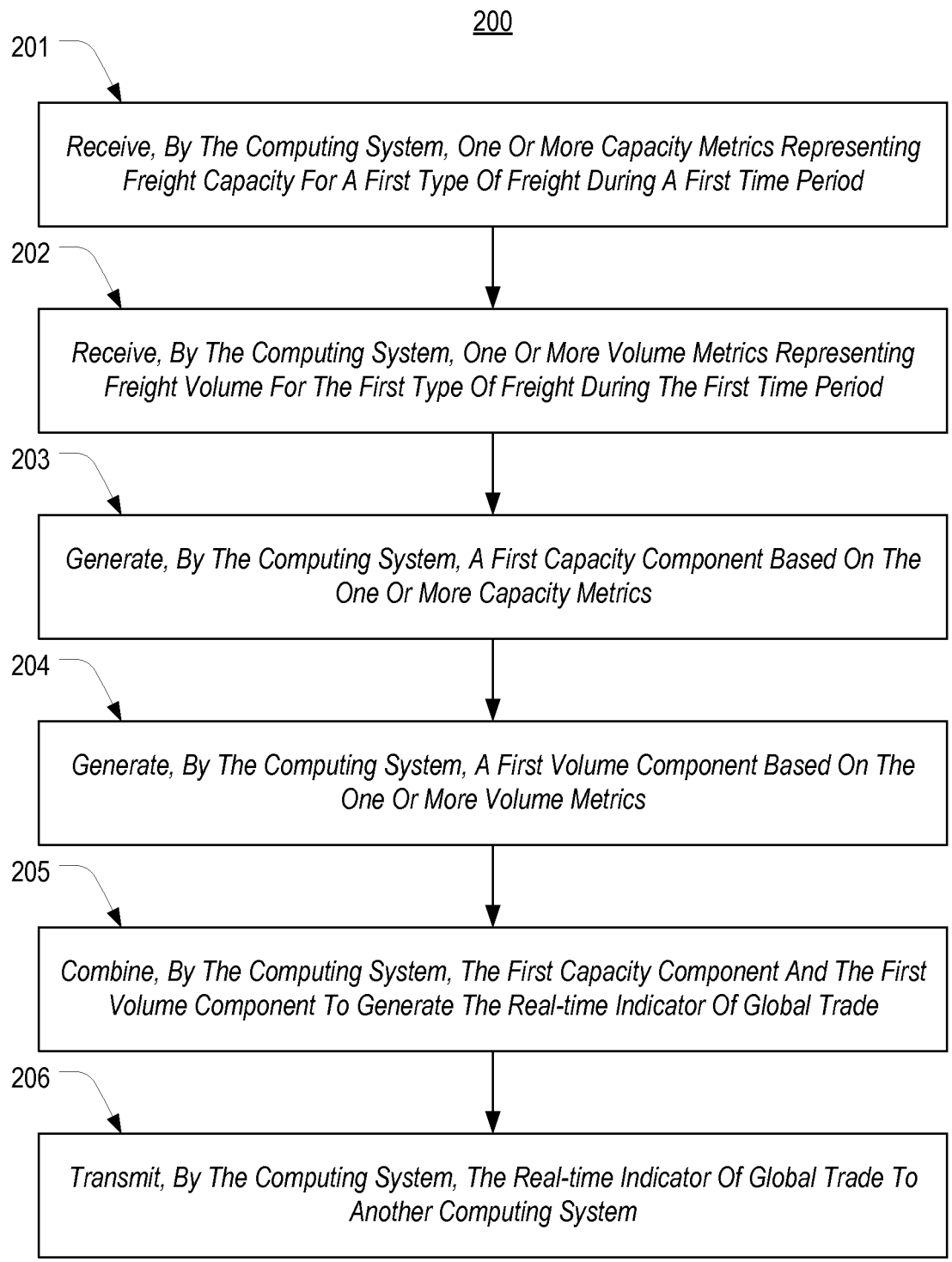
FIG. 2 illustrates a flowchart of an example method for generating a real-time indicator of global trade.

FIG. 2 provides a flowchart of an example method 200 for generating a real-time indicator of global trade. FIG. 2 will be described with reference to FIG. 1.

Method 200 includes an act 201 of receiving, by a computing system, one or more capacity metrics representing freight capacity for a first type of freight during a first time period. For example, server system 101 can receive one or more capacity metrics from one or more of source systems 102a-102n. The capacity metrics may define freight capacity for sea freight, air freight, or rail freight.

Method 200 includes an act 202 of receiving, by the computing system, one or more volume metrics representing freight volume for the first type of freight during the first time period. For example, server system 101 can receive one or more volume metrics from one or more of source systems 102a-102n. The volume metrics may define freight volume for sea freight, air freight, or rail freight.

Method 200 includes an act 203 of generating, by the computing system, a first capacity component based on the one or more capacity metrics. For example, server system 101 can generate a first capacity component based on the one or more capacity metrics received from source systems 102a-102n.

Method 200 includes an act 204 of generating, by the computing system, a first volume component based on the one or more volume metrics. For example, server system 101 can generate a first volume component based on the one or more volume metrics received from source systems 102a-102n.

Method 200 includes an act 205 of combining, by the computing system, the first capacity component and the first volume component to generate the real-time indicator of global trade. For example, server system 101 can combine the first capacity component and the first volume component to generate a real-time indicator of global trade.

Method 200 includes an act 206 of transmitting, by the computing system, the real-time indicator of global trade to another computing system. For example, server system 101 can transmit the generated real-time indicator of global trade to another computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a computing system that is interfaced with one or more remote source systems, for generating a real-time indicator of global trade based on a plurality of metrics that are generated from tracking information retrieved from the source systems over a period of time, the method comprising:

establishing and maintaining a first interface with one or more Automatic Identification Systems that communicate with sea vessels in real-time to obtain, from the sea vessels, sea vessel tracking information;

periodically querying the one or more Automatic Identification Systems via the first interface to retrieve current sea vessel tracking information about a plurality of sea vessels that are currently transporting sea freight, the current sea vessel tracking information including, for each of the plurality of sea vessels that are currently transporting sea freight, at least two of: an identifier of the sea vessel, a type of the sea vessel, a position of the sea vessel, a course of the sea vessel, a speed of the sea vessel, a destination of the sea vessel, an estimated time of arrival of the sea vessel, a draft of the sea vessel and a gross tonnage of the sea vessel;

storing the current sea vessel tracking information that is retrieved over a first period of time;

extracting and calculating, from the current sea vessel tracking information sea freight capacity metrics representing freight capacity of the plurality of sea vessels during the first time period, the sea freight capacity metrics including at least two of: gross tonnage, gross tonnage kilometers, number of departures, and speed for the plurality of sea vessels during the first time period, such that the computing system uses the current sea vessel tracking information, not to track the plurality of sea vessels, but to calculate the sea freight capacity metrics;

extracting and calculating, from the current sea vessel tracking information, sea freight volume metrics representing freight volume for the plurality of sea vessels during the first time period, the sea freight volume metrics including at least two of: twenty-foot units, number of shipments, shipment kilometers, and draft for the plurality of sea vessels during the first time period, such that the computing system uses the current sea vessel tracking information, not to track the plurality of sea vessels, but to calculate the sea freight volume metrics;

performing, by the computing system, one or more calculations on the sea freight capacity metrics to generate a sea freight capacity component based on the sea freight capacity metrics;

performing by the computing system, one or more calculations on the sea freight volume metrics to generate a sea freight volume component based on the sea freight volume metrics;

generating the real-time indicator of global trade as macroeconomic data that represents a current global economic state by combining, via the computing system, the sea freight capacity component and the sea freight volume component; and transmitting, by the computing system, the real-time indicator of global trade to another computing system to thereby cause the real-time indicator to be displayed as a visual indicator that represents the current global economic state.

2. The method of claim 1, wherein generating the sea freight capacity component comprises:

generating one or more of the following factors based on the sea freight capacity metrics:

a number of departures (NOD) factor representing the number of departures of sea vessels during the first time period;

a gross tonnage (GT) factor representing the gross tonnage of each sea vessel that departed during the first time period;

a gross tonnage kilometers (GTK) based on the GT;

a GO/STOP factor representing a ratio of sea vessels in transit during the first time period to sea vessels in port or reporting zero knots during the first time period; or a knots (KTS) factor representing the average speed of each sea vessel that was in transit during the first time period; and generating the sea freight capacity component by combining one or more of the factors.

3. The method of claim 1, wherein generating the sea freight volume component comprises:

generating one or more of the following factors based on the sea freight volume metrics:

a twenty-foot equivalent unit (TEU) factor representing a number of TEUs transported during the first time period;

a number of shipments (NOS) factor representing a number of shipments made during the first time period;

a shipment kilometers (SHK) factor representing the distance of each shipment made during the first time period;

an EXPORT/IMPORT factor representing a ratio of exports to imports during the first time period;

a NOS COUNTRIES factor representing a number of shipments that are exported from and imported to each of a number of countries during the first time period; or a draft (DR) factor representing a draft of each sea vessel that departed during the first time period; and generating the sea freight volume component by combining one or more of the factors.

4. The method of claim 1, further comprising:

establishing and maintaining a second interface with one or more aircraft tracking systems that communicate with aircraft in real-time to obtain, from the aircraft, aircraft tracking information;

periodically querying the one or more aircraft tracking systems via the second interface to retrieve current aircraft tracking information about a plurality of aircraft that are currently transporting air freight, the current aircraft tracking information including, for each of the plurality of aircraft, at least two of: an identification of the aircraft, a position of the aircraft, a speed of the aircraft, a direction of the aircraft, a destination of the aircraft, a freight capacity of the aircraft and a chargeable weight of freight carried by the aircraft;

storing the current aircraft tracking information that is retrieved over the first period of time;

extracting and calculating, from the current aircraft tracking information, air freight capacity metrics representing freight capacity of the plurality of aircraft during the first time period, the air freight capacity metrics including at least two of: available freight tonnage, available freight tonnage kilometers, and a number of departures;

extracting and calculating, from the current aircraft tracking information, air freight volume metrics representing freight volume of the plurality of aircraft during the first time period, the air freight volume metrics including at least two of: a number of shipments, chargeable weight, and chargeable weight kilometers;

performing, by the computing system, one or more calculations on the air freight capacity metrics to generate an air freight capacity component based on the air freight capacity metrics; and performing, by the computing system, one or more calculations on the air freight volume metrics to generate an air freight volume component based on the air freight volume metrics;

wherein the real-time indicator of global trade is generated by combining the sea freight capacity component, the sea freight volume component, the air freight capacity component, and the air freight volume component such that the computing system uses the current sea vessel tracking information and the current aircraft tracking information, not to track the plurality of sea vessels or the plurality of aircraft, but to generate the real-time indicator of global trade as macroeconomic data that represents the current global economic state.

5. The method of claim 4, wherein generating the air freight capacity component comprises:
generating one or more of the following factors based on the air freight capacity metrics:
a number of cargo departures (NODcargo) factor representing the number of cargo aircraft that departed during the first time period;
a number of commercial departures (NODcommercial) factor representing a number of commercial aircraft that departed during the first time period;
an available freight tonnage (AFT) factor representing an available capacity of a number of monitored cargo aircraft that departed during the first time period;
an available freight tonnage kilometers (AFTK) factor based on the AFT;
a number of scheduled commercial departures (NOD SCHEDULEDcommercial) factor representing a number of commercial departures that are scheduled during a subsequent time period;
a number of scheduled cargo departures (NOD SCHEDULEDcargo) factor representing a number of cargo departures that are scheduled during the subsequent time period; or
an aircraft very short term plan (VSTPaircraft) factor representing a ratio of a number of cargo departures during the first time period to a number of cargo departures that were scheduled during the first time period; and
generating the air freight capacity component by combining one or more of the factors.

6. The method of claim 4, wherein generating the air freight volume component comprises:
generating one or more of the following factors based on the air freight capacity metrics:
a chargeable weight (CW) factor representing a chargeable weight of freight on a number of monitored cargo aircraft during the first time period;
a chargeable weight kilometers (CWK) factor based on the CW;
a number of shipments (NOScargo) factor representing the number of shipments made by monitored cargo aircraft during the first time period; or
a NOScargo COUNTRIES factor representing a number of shipments that are exported from and imported to each of a number of countries during the first time period; and
generating the air freight volume component by combining one or more of the factors.

7. The method of claim 4, wherein combining the sea freight capacity component, the sea freight volume component, the air freight capacity component, and the air freight volume component comprises performing a weighted average of the components, wherein the sea freight capacity and volume components are weighted more heavily than the air freight capacity and volume components.

8. The method of 4, further comprising:
establishing and maintaining a third interface with one or more rail tracking systems that obtain train tracking information;
periodically querying the one or more rail tracking systems via the third interface to retrieve current train tracking information about a plurality of trains that are currently transporting rail freight, the current train tracking information including for each of the plurality of trains, at least two of: a number of cars of the train, a number of carloads of the train, and a number of intermodal units of the train;
storing the current train tracking information that is retrieved over the first period of time;
extracting and calculating, from the current train tracking information, rail freight capacity metrics representing freight capacity of the plurality of trains during the first time period, the rail freight capacity metrics including a number of cars and a number of departures;
extracting and calculating, from the current train tracking information, rail freight volume metrics representing freight volume for the plurality of trains during the first time period, the rail freight volume metrics including a number of carloads and a number of intermodal units;
performing, by the computing system, one or more calculations on the rail freight capacity metrics to generate a rail freight capacity component based on the rail freight capacity metrics; and
performing by the computing system, one or more calculations on the air freight volume metrics to generate a rail freight volume component based on the rail freight volume metrics;
wherein the real-time indicator of global trade is generated by combining the sea freight capacity component, the sea freight volume component, the air freight capacity component, the air freight volume component, the rail freight capacity component, and the rail freight volume component such that the computing system uses the current sea vessel tracking information, the current aircraft tracking information and the current train tracking information, not to track the plurality of sea vessels, the plurality of aircraft or the plurality of trains, but to generate the real-time indicator of global trade as macroeconomic data that represents the current global economic state.

9. The method of claim 4, further comprising:
generating, by the computing system, an economic sentiment component based on information obtained from websites of a plurality of companies indicating the companies' intentions to expand, stabilize, or restrict growth; and
wherein the real-time indicator of global trade is generated by combining the sea freight capacity component, the sea freight volume component, the air freight capacity component, the air freight volume component, and the economic sentiment component.

10. The method of claim 1, wherein the first time period comprises a rolling time period.

11. The method of claim 1, wherein generating the sea freight capacity component comprises:
generating each of the following factors based on the sea freight capacity metrics:
a number of departures (NOD) factor representing the number of departures of sea vessels during the first time period;
a gross tonnage (GT) factor representing the gross tonnage of each sea vessel that departed during the first time period;
a gross tonnage kilometers (GTK) based on the GT;
a GO/STOP factor representing a ratio of sea vessels in transit during the first time period to sea vessels in port or reporting zero knots during the first time period; and
a knots (KTS) factor representing the average speed of each sea vessel that was in transit during the first time period; and
generating the sea freight capacity component by combining each of the factors.

12. The method of claim 11, wherein generating the sea freight volume component comprises:
generating each of the following factors based on the sea freight volume metrics:
a twenty-foot equivalent unit (TEU) factor representing a number of TEUs transported during the first time period;
a number of shipments (NOS) factor representing a number of shipments made during the first time period;
a shipment kilometers (SHK) factor representing the distance of each shipment made during the first time period;
an EXPORT/IMPORT factor representing a ratio of exports to imports during the first time period;
a NOS COUNTRIES factor representing a number of shipments that are exported from and imported to each of a number of countries during the first time period; and
a draft (DR) factor representing a draft of each vessel that departed during the first time period; and
generating the sea freight volume component by combining each of the factors.

13. The method of claim 4, wherein generating the air freight capacity component comprises:
generating each of the following factors based on the air freight capacity metrics:
a number of cargo departures (NODcargo) factor representing the number of cargo aircraft that departed during the first time period;
a number of commercial departures (NODcommercial) factor representing a number of commercial aircraft that departed during the first time period;
an available freight tonnage (AFT) factor representing an available capacity of a number of monitored cargo aircraft that departed during the first time period;
an available freight tonnage kilometers (AFTK) factor based on the AFT;
a number of scheduled commercial departures (NOD SCHEDULEDcommercial) factor representing a number of commercial departures that are scheduled during a subsequent time period;
a number of scheduled cargo departures (NOD SCHEDULEDcargo) factor representing a number of cargo departures that are scheduled during the subsequent time period; and
an aircraft very short term plan (VSTPaircraft) factor representing a ratio of a number of cargo departures during the first time period to a number of cargo departures that were scheduled during the first time period; and
generating the air freight capacity component by combining one or more of the factors.

14. The method of claim 13, wherein generating the air freight volume component comprises:
generating each of the following factors based on the air freight capacity metrics:
a chargeable weight (CW) factor representing a chargeable weight of freight on a number of monitored cargo aircraft during the first time period;
a chargeable weight kilometers (CWK) factor based on the CW;
a number of shipments (NOScargo) factor representing the number of shipments made by monitored cargo aircraft during the first time period; and
a NOScargo COUNTRIES factor representing a number of shipments that are exported from and imported to each of a number of countries during the first time period; and
generating the air freight volume component by combining one or more of the factors.

15. A method, performed by a computing system that is interfaced with remote source systems, for generating a real-time indicator of global trade based on a plurality of metrics that are generated from tracking information retrieved from the source systems over a period of time, the method comprising:
establishing and maintaining a first interface with one or more Automatic Identification Systems that communicate with sea vessels in real-time to obtain, from the sea vessels, sea vessel tracking information;
establishing and maintaining a second interface with one or more aircraft tracking systems that communicate in real-time with aircraft to obtain, from the aircraft, tracking information about the aircraft;
periodically querying the one or more Automatic Identification Systems via the first interface to retrieve current sea vessel tracking information about a plurality of sea vessels that are currently transporting sea freight, the current sea vessel tracking information including, for each of the plurality of sea vessels that are currently transporting sea freight, at least two of: an identifier of the sea vessel, a type of the sea vessel, a position of the sea vessel, a course of the sea vessel, a speed of the sea vessel, a destination of the sea vessel, an estimated time of arrival of the sea vessel, a draft of the sea vessel and a gross tonnage of the sea vessel;
periodically querying the one or more aircraft tracking systems via the second interface to retrieve current aircraft tracking information about a plurality of aircraft that are currently transporting air freight, the current aircraft tracking information including, for each of the plurality of aircraft, at least two of: an identification of the aircraft, a position of the aircraft, a speed of the aircraft, a direction of the aircraft, a destination of the aircraft, a freight capacity of the aircraft and a chargeable weight of freight carried by the aircraft;

storing the current sea vessel tracking information that is retrieved over a first period of time;

storing the current aircraft tracking information that is retrieved over the first period of time;

extracting and calculating, from the current sea vessel tracking information, sea freight capacity metrics representing freight capacity of the plurality of sea vessels during the first time period, the sea freight capacity metrics including one or more of: gross tonnage, gross tonnage kilometers, number of departures, or speed for the plurality of sea vessels during the first time period, such that the computing system uses the current sea vessel tracking information, not to track the plurality of sea vessels, but to calculate the sea freight capacity metrics;

extracting and calculating, from the current sea vessel tracking information, sea freight volume metrics representing freight volume for the plurality of sea vessels during the first time period, the sea freight volume metrics including one or more of: twenty-foot units, number of shipments, shipment kilometers, or draft for the plurality of sea vessels during the first time period, such that the computing system uses the current sea vessel tracking information, not to track the plurality of sea vessels, but to calculate the sea freight volume metrics;

generating, by the computing system, a sea freight capacity component by generating and combining two or more of the following factors based on the sea freight capacity metrics:
  a number of departures (NOD) factor representing the number of departures of sea vessels during the first time period;
  a gross tonnage (GT) factor representing the gross tonnage of each sea vessel that departed during the first time period;
  a gross tonnage kilometers (GTK) based on the GT;
  a GO/STOP factor representing a ratio of sea vessels in transit during the first time period to vessels in port or reporting zero knots during the first time period; or
  a knots (KTS) factor representing the average speed of each sea vessel that was in transit during the first time period;

generating, by the computing system, a sea freight volume component by generating and combining two or more of the following factors based on the sea freight volume metrics:
  a twenty-foot equivalent unit (TEU) factor representing a number of TEUs transported during the first time period;
  a number of shipments (NOS) factor representing a number of shipments made during the first time period;
  a shipment kilometers (SHK) factor representing the distance of each shipment made during the first time period;
  an EXPORT/IMPORT factor representing a ratio of exports to imports during the first time period;
  a NOS COUNTRIES factor representing a number of shipments that are exported from and imported to each of a number of countries during the first time period; or
  a draft (DR) factor representing a draft of each vessel that departed during the first time period;

extracting and calculating, from the current aircraft tracking information, air freight capacity metrics representing freight capacity of the plurality of aircraft during the first time period, the air freight capacity metrics including one or more of: available freight tonnage, available freight tonnage kilometers, or a number of departures;

extracting and calculating, from the current aircraft tracking information, air freight volume metrics representing freight volume of the plurality of aircraft during the first time period, the air freight volume metrics including one or more of: a number of shipments, chargeable weight, or chargeable weight kilometers;

generating, by the computing system, an air freight capacity component by generating and combining two or more of the following factors based on the air freight capacity metrics:
  a number of cargo departures (NODcargo) factor representing the number of cargo aircraft that departed during the first time period;
  a number of commercial departures (NODcommercial) factor representing a number of commercial aircraft that departed during the first time period;
  an available freight tonnage (AFT) factor representing an available capacity of a number of monitored cargo aircraft that departed during the first time period;
  an available freight tonnage kilometers (AFTK) factor based on the AFT;
  a number of scheduled commercial departures (NOD SCHEDULEDcommercial) factor representing a number of commercial departures that are scheduled during a subsequent time period;
  a number of scheduled cargo departures (NOD SCHEDULEDcargo) factor representing a number of cargo departures that are scheduled during the subsequent time period; or
  an aircraft very short term plan (VSTPaircraft) factor representing a ratio of a number of cargo departures during the first time period to a number of cargo departures that were scheduled during the first time period; and generating, by the computing system, an air freight volume component by generating and combining two or more of the following factors based on the air freight volume metrics:
  a chargeable weight (CW) factor representing a chargeable weight of freight on a number of monitored cargo aircraft during the first time period;
  a chargeable weight kilometers (CWK) factor based on the CW;
  a number of shipments (NOScargo) factor representing the number of shipments made by monitored cargo aircraft during the first time period; or
  a NOScargo COUNTRIES factor representing a number of shipments that are exported from and imported to each of a number of countries during the first time period;

generating the real-time indicator of global trade as macroeconomic data that represents a current global economic state by combining, via the computing system, the sea freight capacity component, the sea freight volume component, the air freight capacity component and the air freight volume component; and transmitting, by the computing system, the real-time indicator of global trade to another computing system to thereby cause the real-time indicator to be displayed as a visual indicator of global trade that represents the current global economic state.

16. The method of 15, further comprising:

establishing and maintaining a third interface with one or more rail tracking systems that obtain train tracking information;

periodically querying the one or more rail tracking systems via the third interface to retrieve current train tracking information about a plurality of trains that are currently transporting rail freight, the current train tracking information including for each of the plurality of trains, one or more of: a number of cars of the train, a number of carloads of the train, or a number of intermodal units of the train;

storing the current train tracking information that is retrieved over the first period of time;

extracting and calculating, from the current train tracking information, rail freight capacity metrics representing freight capacity of the plurality of trains during the first time period, the rail freight capacity metrics including a number of cars and a number of departures;

extracting and calculating, from the current train tracking information, rail freight volume metrics representing freight volume for the plurality of trains during the first time period, the rail freight volume metrics including a number of carloads and a number of intermodal units;

performing, by the computing system, one or more calculations on the rail freight capacity metrics to generate a rail freight capacity component based on the rail freight capacity metrics; and performing, by the computing system, one or more calculations on the air freight volume metrics to generate a rail freight volume component based on the rail freight volume metrics;

wherein the real-time indicator of global trade is generated by combining the sea freight capacity component, the sea freight volume component, the air freight capacity component, the air freight volume component, the rail freight capacity component, and the rail freight volume component such that the computing system uses the current sea vessel tracking information, the current aircraft tracking information and the current train tracking information, not to track the plurality of sea vessels, the plurality of aircraft or the plurality of trains, but to generate the real-time indicator of global trade as macroeconomic data that represents the current global economic state.

17. A method, performed by a computing system that is interfaced with remote source systems, for generating a real-time indicator of global trade based on a plurality of metrics that are generated from tracking information retrieved from the source systems over a period of time, the method comprising:

establishing and maintaining a first interface with one or more Automatic Identification Systems that communicate with sea vessels in real-time to obtain, from the sea vessels, sea vessel tracking information;

establishing and maintaining a second interface with one or more aircraft tracking systems that communicate in real-time with aircraft to obtain, from the aircraft, tracking information about the aircraft;

periodically querying the one or more Automatic Identification Systems via the first interface to retrieve current sea vessel tracking information about a plurality of sea vessels that are currently transporting sea freight, the current sea vessel tracking information including, for each of the plurality of sea vessels that are currently transporting sea freight, at least two of: an identifier of the sea vessel, a type of the sea vessel, a position of the sea vessel, a course of the sea vessel, a speed of the sea vessel, a destination of the sea vessel, an estimated time of arrival of the sea vessel, a draft of the sea vessel and a gross tonnage of the sea vessel;

periodically querying the one or more aircraft tracking systems via the second interface to retrieve current aircraft tracking information about a plurality of aircraft that are currently transporting air freight, the current aircraft tracking information including, for each of the plurality of aircraft, at least two of: an identification of the aircraft, a position of the aircraft, a speed of the aircraft, a direction of the aircraft, a destination of the aircraft, a freight capacity of the aircraft and a chargeable weight of freight carried by the aircraft;

storing the current sea vessel tracking information that is retrieved over a first period of time;

storing the current aircraft tracking information that is retrieved over the first period of time;

extracting and calculating, from the current sea vessel tracking information, sea freight capacity metrics representing freight capacity of the plurality of sea vessels during the first time period, the sea freight capacity metrics including gross tonnage, gross tonnage kilometers, number of departures, and speed for the plurality of sea vessels during the first time period, such that the computing system uses the current sea vessel tracking information, not to track the plurality of sea vessels, but to calculate the sea freight capacity metrics;

extracting and calculating, from the current sea vessel tracking information, sea freight volume metrics representing freight volume for the plurality of sea vessels during the first time period, the sea freight volume metrics including twenty-foot units, number of shipments, shipment kilometers, and draft for the plurality of sea vessels during the first time period, such that the computing system uses the current sea vessel tracking information, not to track the plurality of sea vessels, but to calculate the sea freight volume metrics;

generating, by the computing system, a sea freight capacity component by generating and combining each of the following factors based on the sea freight capacity metrics:

a number of departures (NOD) factor representing the number of departures of sea vessels during the first time period;

a gross tonnage (GT) factor representing the gross tonnage of each sea vessel that departed during the first time period;

a gross tonnage kilometers (GTK) based on the GT;

a GO/STOP factor representing a ratio of sea vessels in transit during the first time period to vessels in port or reporting zero knots during the first time period; or a knots (KTS) factor representing the average speed of each sea vessel that was in transit during the first time period;

generating, by the computing system, a sea freight volume component by generating and combining each of the following factors based on the sea freight volume metrics:
- a twenty-foot equivalent unit (TEU) factor representing a number of TEUs transported during the first time period;
- a number of shipments (NOS) factor representing a number of shipments made during the first time period;
- a shipment kilometers (SHK) factor representing the distance of each shipment made during the first time period;
- an EXPORT/IMPORT factor representing a ratio of exports to imports during the first time period;
- a NOS COUNTRIES factor representing a number of shipments that are exported from and imported to each of a number of countries during the first time period; and
- a draft (DR) factor representing a draft of each vessel that departed during the first time period;

extracting and calculating, from the current aircraft tracking information, air freight capacity metrics representing freight capacity of the plurality of aircraft during the first time period, the air freight capacity metrics including available freight tonnage, available freight tonnage kilometers, and a number of departures;

extracting and calculating, from the current aircraft tracking information, air freight volume metrics representing freight volume of the plurality of aircraft during the first time period, the air freight volume metrics including a number of shipments, chargeable weight, and chargeable weight kilometers;

generating, by the computing system, an air freight capacity component by generating and combining each of the following factors based on the air freight capacity metrics:
- a number of cargo departures (NODcargo) factor representing the number of cargo aircraft that departed during the first time period;
- a number of commercial departures (NODcommercial) factor representing a number of commercial aircraft that departed during the first time period;
- an available freight tonnage (AFT) factor representing an available capacity of a number of monitored cargo aircraft that departed during the first time period;
- an available freight tonnage kilometers (AFTK) factor based on the AFT;
- a number of scheduled commercial departures (NOD SCHEDULEDcommercial) factor representing a number of commercial departures that are scheduled during a subsequent time period;
- a number of scheduled cargo departures (NOD SCHEDULEDcargo) factor representing a number of cargo departures that are scheduled during the subsequent time period; and
- an aircraft very short term plan (VSTPaircraft) factor representing a ratio of a number of cargo departures during the first time period to a number of cargo departures that were scheduled during the first time period; and generating, by the computing system, an air freight volume component by generating and combining each of the following factors based on the air freight volume metrics:
- a chargeable weight (CW) factor representing a chargeable weight of freight on a number of monitored cargo aircraft during the first time period;
- a chargeable weight kilometers (CWK) factor based on the CW;
- a number of shipments (NOScargo) factor representing the number of shipments made by monitored cargo aircraft during the first time period; or
- a NOScargo COUNTRIES factor representing a number of shipments that are exported from and imported to each of a number of countries during the first time period;

generating the real-time indicator of global trade as macroeconomic data that represents a current global economic state by combining, via the computing system, the sea freight capacity component, the sea freight volume component, the air freight capacity component and the air freight volume component; and transmitting, by the computing system, the real-time indicator of global trade to another computing system to thereby cause the real-time indicator to be displayed as a visual indicator that represents the current global economic state.

* * * * *